Figure 1:
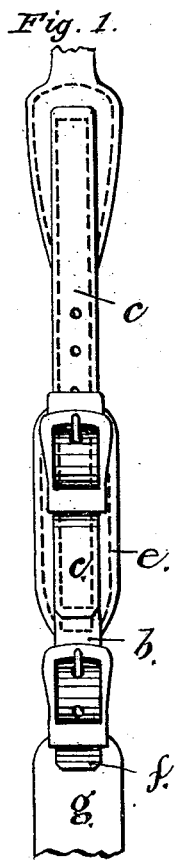
Figure 2:
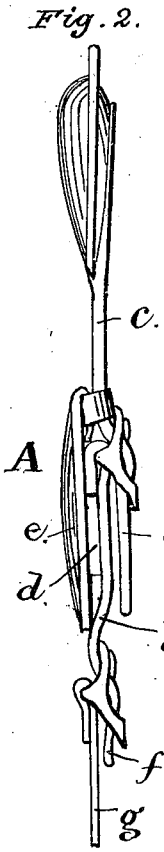

J. R. STONE.
PAD SKIRT-LOOPS FOR HARNESS.

No. 186,695. Patented Jan. 30, 1877.

UNITED STATES PATENT OFFICE.

JEREMIAH R. STONE, OF GRAHAM, MISSOURI.

IMPROVEMENT IN PAD SKIRT-LOOPS FOR HARNESS.

Specification forming part of Letters Patent No. 186,695, dated January 30, 1877; application filed November 25, 1876.

*To all whom it may concern:*

Be it known that I, JEREMIAH R. STONE, of Graham, in the county of Nodaway and State of Missouri, have invented certain new and useful Improvements in Adjustable Pad Skirt-Loop for Harness; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Heretofore harness has been made with stationary skirt-loops, through which the tugs or traces pass, or with the pad connected to the trace-buckle; and the disadvantages attending them have been numerous, among which may be mentioned the following, viz: If the stationary loop (through which the trace passes) is low enough for the larger horse of the team, it is too low for the smaller horse; and if it be high enough for the smaller horse, it is too high for the larger one. If made short enough from the trace-buckle to the hames to fit a short horse, it is too short between those points for the larger horse, and, not being adjustable, it brings the pad too far forward on his withers, and draws the belly-band out of its true position, and too close to his forelegs. If made long enough for the larger, it is too long for the smaller horse, and throws the pad and belly-band too far back. If the trace be lifted by the loop it is impossible to be in a straight line, and its draft is at a great disadvantage, and it exerts a constant strain and needless wear on the under side of the loop, and makes it uneasy for the horse; and if, on the contrary, the trace pulls upward on the loop, there is useless wear on the upper side of the loop; and these difficulties also attend more or less upon the hitching at high or low draft, and the harness does not wear half as long as it should.

To avoid or remedy these defects, I make an adjustable pad skirt-loop, which, when hitching at high or low draft, can be regulated so that the tug shall draw straight through the loop under all conditions, and without undue wear on the loop, either at its upper or lower side, thus adapting it also to horses of any size, height, or girth, the loop being, at the same time, removable from the harness, so that it may be attached to any pad in use.

In the drawings, A represents the adjustable loop-pad, consisting of a short strap, $b$, provided with a buckle, whereby it may be connected to the strap $c$ of the harness-saddle, with a loop, $d$, for the trace or tug, a pad, $e$, and with an end, $f$, by which it may be buckled to the strap $g$.

This construction, it will be perceived, allows of the adjustment, at will, of the loop-pad to any position which the exigencies of the case may require, so as to insure the pulling of the tug or trace in a straight line under all possible conditions—the buckle-holes in the straps $b$ and $c$, but more particularly in the latter, affording ample range for these adjustments.

My improvement may be attached to single harness, and with the saving of one belly-band, and it makes no additional cost to the harness.

It will be observed that as the loop is made of leather straps, no special parts constructed of metal are required; that the pad $e$ forms part of and closes the loop, and cannot separate from it, but, on the contrary, it always protects the horse; that there is no metal in the loop which can come in contact with the animal; that any leather-worker or harness-maker can readily make or repair my improved device, needing nothing but ordinary materials for the purpose.

I do not claim, broadly, an adjustable tug loop or slide, regardless of its construction; but

I claim—

The adjustable pad skirt-loop described, adapted to receive the harness tug or trace, the same being made of leather, and consisting of a short strap, $b$, and its buckle-loop $d$ and pad $e$, all substantially as and for the purpose described.

JEREMIAH R. STONE.

Witnesses:
JOSEPH LONG,
C. T. SIMPSON.